H. W. SPELLMAN & E. TWIGG.
SAFETY RELEASE DEVICE.
APPLICATION FILED JAN. 19, 1912.
1,051,462.
Patented Jan. 28, 1913.
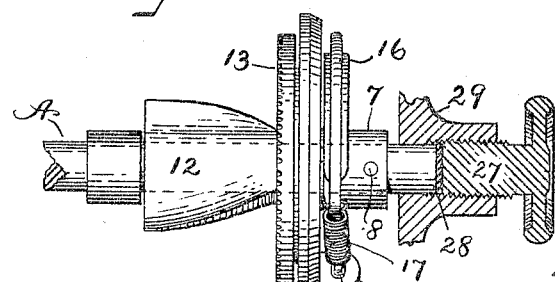
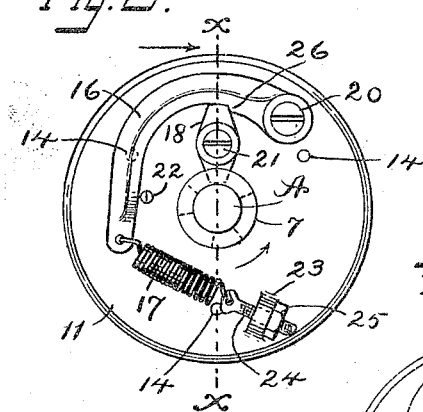
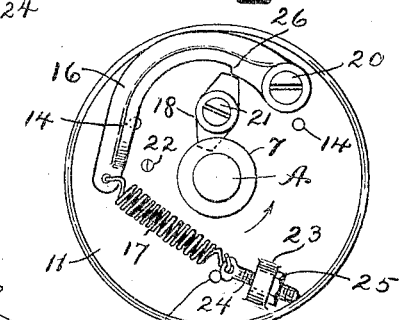
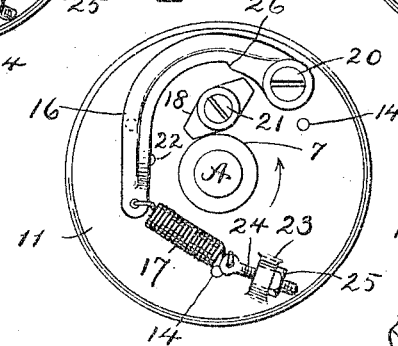
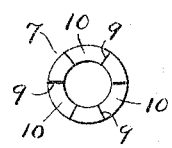
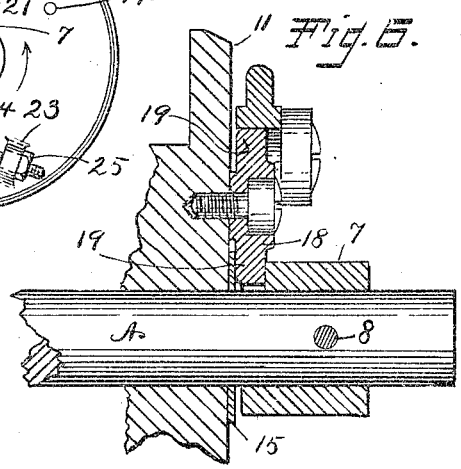
Witnesses:—
S. H. Clarke
Roger Edwards
Inventors
Herbert W. Spellman
Ernest Twigg
By Louis M. Schmidt
Atty.

UNITED STATES PATENT OFFICE.

HERBERT W. SPELLMAN AND ERNEST TWIGG, OF NEW BRITAIN, CONNECTICUT, ASSIGNORS TO LANDERS, FRARY AND CLARK, OF NEW BRITAIN, CONNECTICUT, A CORPORATION.

SAFETY RELEASE DEVICE.

1,051,462. Specification of Letters Patent. Patented Jan. 28, 1913.

Application filed January 19, 1912. Serial No. 672,061.

*To all whom it may concern:*

Be it known that we, HERBERT W. SPELLMAN and ERNEST TWIGG, citizens of the United States, residing at New Britain, in the county of Hartford and State of Connecticut, have invented certain new and useful Improvements in Safety Release Devices, of which the following is a specification.

Our invention relates to improvements in safety release devices for coffee mills and analogous machines, and the object of our invention is simplicity and economy in construction with convenience and efficiency in operation, especially with reference to automatically opening the mill disk when released from rotation and with reference to convenience of readjustment after release.

In the accompanying drawing:—Figure 1 is an elevation of a part of a mill shaft, the feed worm and the moving disk flange and disk, together with our safety release applied thereto, also a part of a mill case, a step and an adjusting screw in section. Fig. 2 is an end view of the said shaft, showing one side of the disk flange and the said release. Fig. 3 is a like view of the same with the parts in the position they have immediately after the release is first tripped. Fig. 4 is a like view of the same in the position the parts have when at rest, after a release. Fig. 5 is an end view of the collar or hub on which the driving shoulders are formed. Fig. 6 is an enlarged broken sectional view of the release, etc., on the line *x x* of Fig. 2, the mill disk being omitted and the shaft shown in elevation.

A designates the shaft of a coffee mill upon which is a collar or hub 7 that is fixed upon the said shaft in any ordinary manner, as for example by means of a pin 8, so that the said collar rotates with the said shaft. This collar has one or more substantially radial driving shoulders 9 and the same number of end faces 10 adjacent to the said shoulders. The disk-flange 11 and feed worm 12, are or may be bored through axially to fit the shaft A upon which they are mounted loosely enough to permit the shaft to turn freely therein when the disk flange is released from rotation with said shaft. The mill disk 13, for convenience of construction, is made separately from the disk flange and secured thereto in any proper manner as for example by screws 14. When the disk is so mounted and secured, the two move together the same as if formed in one piece. In use the disk flange is slipped along on the shaft A up against the collar 7, as shown, and the parts are run in connection with a fixed mill disk and case of any ordinary construction. For the purpose of forming, in effect, a shouldered projection on the outer end of the disk flange, adjacent to the shaft, we place a washer 15 thereon, but it is not necessary that the same should be formed as a separate piece from the said disk flange. The mill shaft A is confined against moving endwise in the direction to separate the mill disks, by means of an adjusting screw 27 and step 28 in a part of the mill case 29 in the ordinary manner of grinding mill adjustments.

In order to drive the moving disk 13 with the shaft A and release the disk therefrom in case of undue obstruction, as for example, the introduction between the disks of a stone or a nail, and also to open up the disks at the time of release, we employ in addition to the driving shoulder 9 and end face 10, a curved lever 16, spring 17 and turn button 18. In order to facilitate moving the button into place on the top of the shouldered projection, one or the other may be beveled as for example, the beveled corner 19 of the button. The said lever is pivotally mounted on one side of the disk flange 11 by means of a screw 20, while the turn button 18 is also so mounted by a screw 21. The said flange is provided with a stop 22 to limit the movement of the curved lever 16 inwardly, and also with a stud 23 through which a spring adjusting screw 24 passes, the said screw being provided with a nut 25 for adjusting and holding the said screw in position within the said stud. The spring 17 is connected by one end with the said adjusting screw 24, and by its other end with the outer end of the curved lever, so as to have a constant tendency to hold the said lever against the stop 22. The said curved lever is provided at its inner edge, adjacent to the turn button, with a holding shoulder 26, which is slightly inclined and faces in a direction to stop the movement of the turn button when the end nearest the said lever moves toward the axis of the said lever. When the turn button stands in the position shown in Fig. 2, one end bears against the inner edge of the lever so as to hold that lever slightly away from the stop 22, while the said turn button may at the same time have one side, near its end, in contact with the holding shoulders of the said lever. In addition thereto the end of the disk flange, one end of the turn button and end face 10 on the collar 7 will be in engagement when the shaft A is forced toward the mill disk by the mill adjusting screw 27. The end face 10 on the collar is a distance from that end of the said collar which faces the disk flange about equal to the thickness of the turn button measured in the longitudinal direction of the mill shaft, so that the said parts hold the disk flange away from the shouldered projection thereon as shown in Fig. 6. When so arranged, and the mill shaft is turned in the proper direction, as indicated by the curved darts in Figs. 2, 3 and 4, a driving shoulder 9 of the collar 7 engages the turn button, at one end, and forces the other end of said button against the holding shoulder of the curved lever so as to drive the moving disk with the shaft, so long as no undue strain or resistance is brought to bear on the moving disk. The parts thus constructed may be set so as to drive the moving disk with the shaft for the normal operation of the mill by adjusting the tension of the spring 17. Whenever there is undue strain or resistance, the pressure of the driving shoulder against the turn button will force the opposite end of the said button against the holding shoulder of the curved lever with such power as to move the lever outwardly and let that end of the turn button pass the said shoulder, as shown in Fig. 3. The shaft then rotates freely while the flange and disk are stationary, the button turning sufficiently to permit the driving shoulder 9 to pass it and the lever 16 is then forced against the stop 22 by the spring 17 as shown in Fig. 4. At the same time that the disk flange is released from rotation with the shaft, the movement of the turn button in making such release, provided the shouldered projection 15 is present, will disengage, so that the disk flange and moving disk carried thereby may move endwise on the shaft toward the adjusting screw, and thereby open up the mill disks so as to loosen their grip on the obstruction that may be between them. The machine may then be taken apart to remove the obstruction and to reset the releasing devices. This resetting may be done by merely turning the turn button by hand, so as to bring one end against the inner edge of the curved lever at a point outside of the holding shoulder and then up against the said shoulder, thereby forcing the lever outwardly to throw the tension of the spring on said lever and the force thereof from the said lever to the end of the turn button. The shaft and collar may then be adjusted for having a driving shoulder and end face of the said collar engage one end of the button, all as before described and shown in Figs. 1, and 2, whereby the disk will be again driven, as soon as the rotation of the shaft forces one of the driving shoulders upon the turn button.

We claim as our invention:—

1. In a mill, the combination of a shaft, a disk loosely mounted thereon, a driving shoulder rotating with the said shaft, a lever pivotally mounted on the said disk and provided with a holding shoulder at its inner edge, a spring for holding the said lever inwardly and a turn button mounted on the said disk for engaging the said holding shoulder by one end while its other end is engaged by the said driving shoulder.

2. In a mill, the combination of a shaft, a disk loosely mounted thereon, a driving shoulder rotating with the said shaft, a lever pivotally mounted on the said disk and provided with a holding shoulder at its inner edge, a spring for holding the said lever inwardly, a turn button mounted on the said disk for engaging the said holding shoulder by one end while its other end is engaged by the said driving shoulder and means for adjusting the tension of the said spring to vary the resistance that may be required to trip the turn button.

3. In a mill, the combination of a shaft, means for holding the said shaft against longitudinal movement in one direction, a disk loosely mounted on the said shaft, a collar or hub on the said shaft having a substantially radially arranged driving shoulder and an end face adjacent thereto, a lever pivotally mounted on the said disk and provided with a holding shoulder at its inner edge, a spring acting on the said lever and a turn button mounted on the said disk for engaging the said lever and collar and also for engaging the confronting faces of the said collar and disk.

HERBERT W. SPELLMAN.
ERNEST TWIGG.

Witnesses:
J. N. STANLEY.
C. H. DEMING.